United States Patent [19]
Clarke

[11] 3,795,378
[45] Mar. 5, 1974

[54] SELF-ADJUSTING TRIPOD

[76] Inventor: Robert G. Clarke, P.O. 567, Waldo Point, Sausalito, Calif. 94965

[22] Filed: Jan. 3, 1972

[21] Appl. No.: 214,657

[52] U.S. Cl. .............................. 248/168, 248/188.3
[51] Int. Cl. ........................................ F16m 11/38
[58] Field of Search ..... 248/168, 169, 188.2, 188.3, 248/354 H

[56] References Cited
UNITED STATES PATENTS

| | | | |
|---|---|---|---|
| 2,591,051 | 4/1952 | Caldwell | 248/168 |
| 2,908,472 | 10/1959 | McDonald | 248/188.3 |

FOREIGN PATENTS OR APPLICATIONS

| | | | |
|---|---|---|---|
| 1,203,283 | 7/1959 | France | 248/354 H |
| 718,778 | 11/1966 | Italy | 248/168 |

*Primary Examiner*—Marion Parsons, Jr.
*Attorney, Agent, or Firm*—Christensen, O'Connor, Garrison & Havelka

[57] ABSTRACT

A tripod whose platform can be adjusted to any desired level or angle in one operation with a minium of adjustment includes a sealed reservoir attached to the platform. A valve in the platform has an inlet coupled to the reservoir by a tube and a plurality of outlets. Each leg is pivotally attached to the platform and comprises a plurality of telescopic, hollow cylinders. Means are provided for coupling the interior of each leg to a corresponding outlet of the valve. The reservoir is filled with both a hydraulic fluid and a pneumatic fluid, under pressure. When the valve is open, the pneumatic fluid forces the hydraulic fluid through the tube, the valve, and the coupling means into each leg so as to exert an extending force thereon. The pneumatic fluid pressure is chosen so that extension can be regulated by manual pressure exerted on the platform. When a desired angle or position is reached, the valve is closed to lock the hydraulic fluid in each leg and thus maintain the platform in the desired angle or position.

5 Claims, 4 Drawing Figures

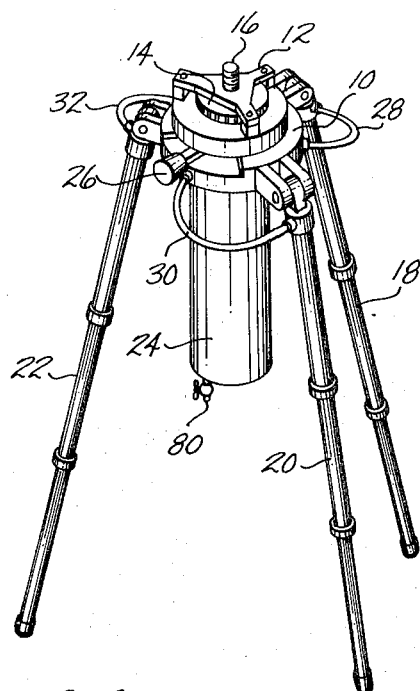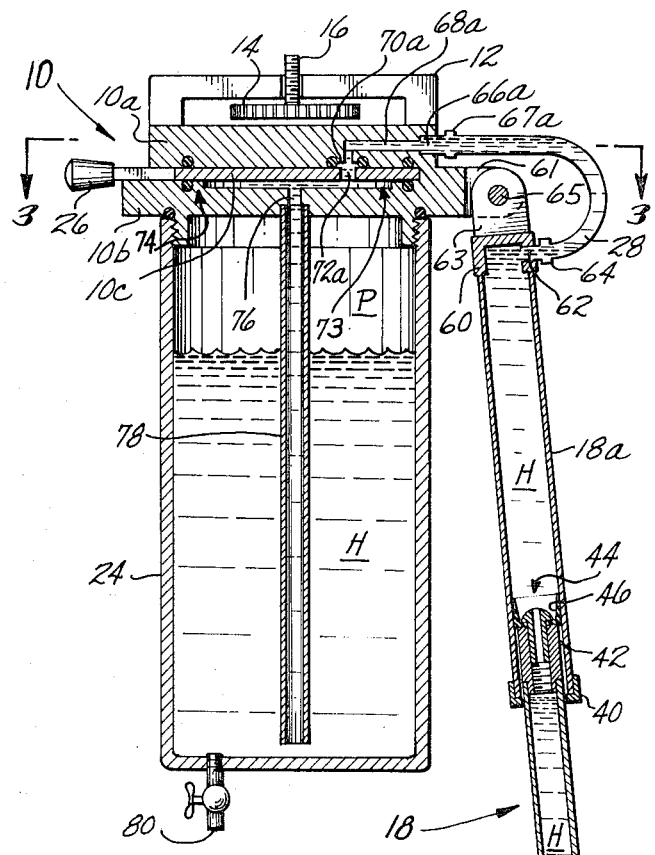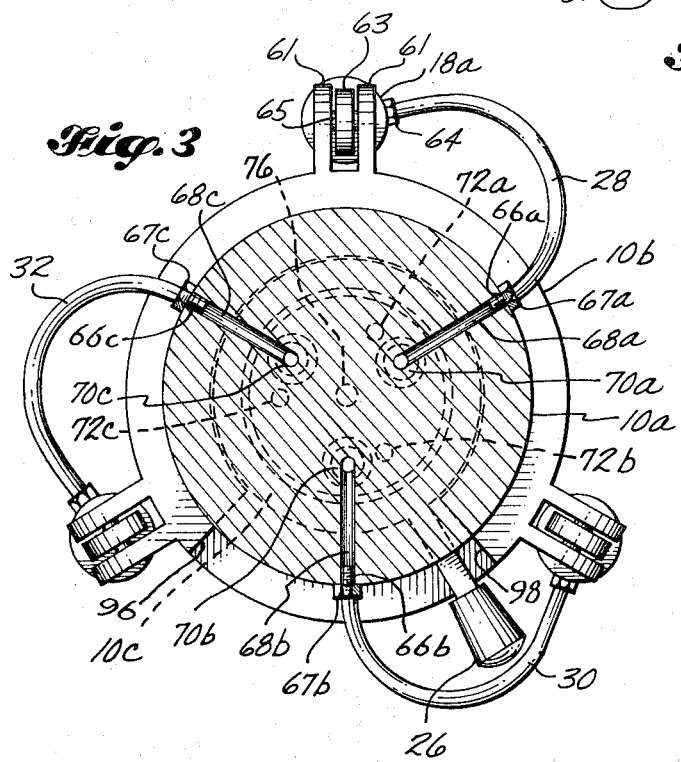

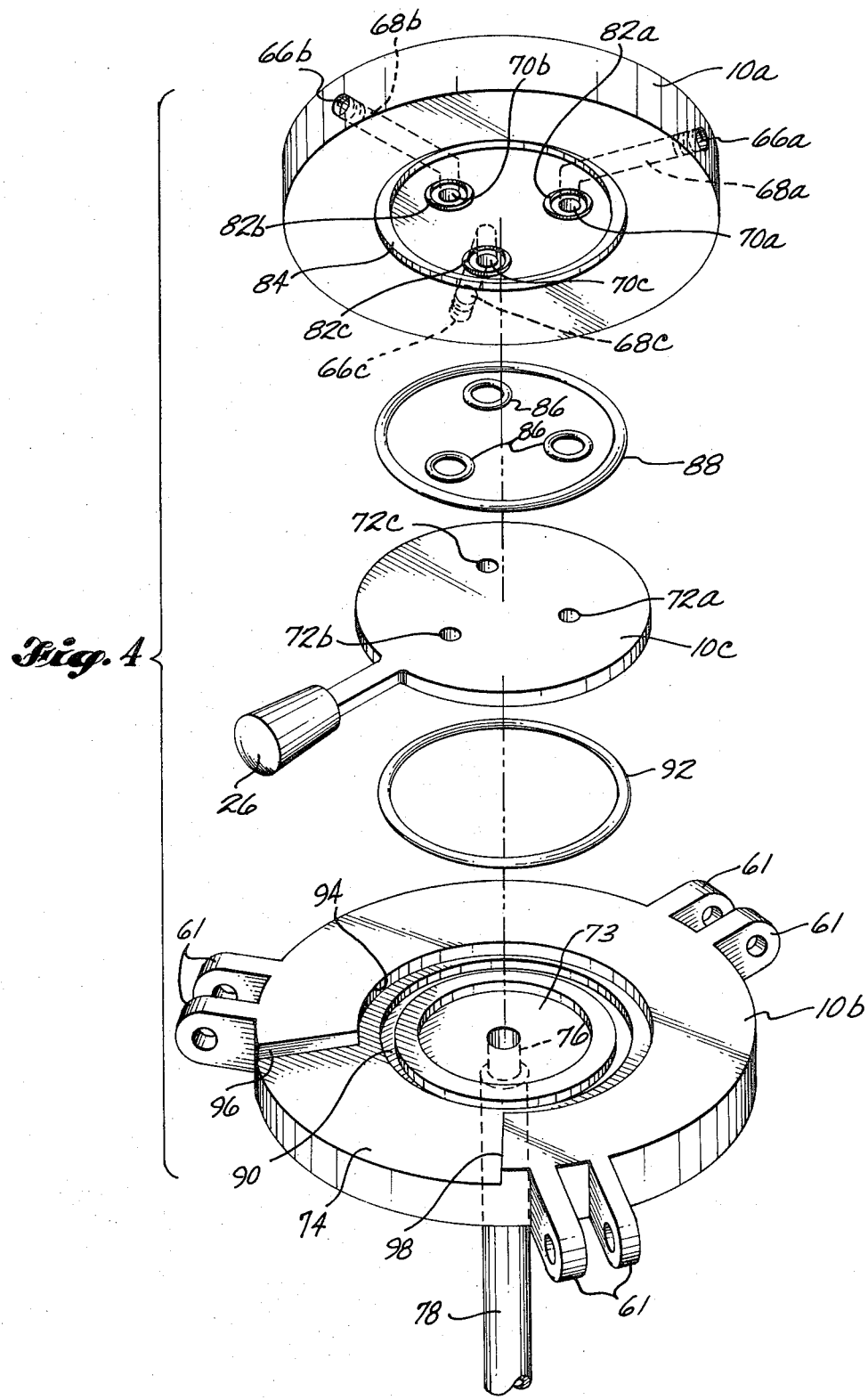

SELF-ADJUSTING TRIPOD

FIELD OF THE INVENTION

This invention generally relates to camera, surveyors' and instrument tripods, and, more particularly, to such tripods wherein the angle or position of the tripod platform is self-adjustable.

BACKGROUND OF THE INVENTION

Many designs of tripods for supporting a camera, or surveyor's quadrant, or other instrument, have been proposed and used in the past. For the most part, the tripod has found particular applicability in providing an extremely stable platform for the measurement or recording of relatively slow-moving events or conditions, such as portrait photography, range and height measurements, and the like. This limitation on use arises primarily from the fact that the very elements in the tripod that provide stability also require relative immobility. For example, each leg thereof is normally provided into a plurality of telescopic, extendible sections, wherein the sections are maintained in a given degree of extension by suitable manually operated clamping means. Although such an arrangement provides a very stable platform, the clamping means must be individually unlocked if the platform is to be moved to another angle or position, then re-locked when that position is attained. During this operation, the user of the tripod generally cannot use the camera, instrument or other item supported by the platform.

It is therefore an object of this invention to provide a tripod whose platform is effectively self-adjusting, that is, which can be moved to any desired angle or position by a simple manipulation by the operator.

It is a further object of this invention to provide such a tripod whose platform can be moved to any desired position or angle in a very short period of time without the necessity for repeated adjustments of means clamping the legs thereof.

It is yet another object of this invention to provide such a tripod which is continuously movable between a series of angles or positions to provide a stable platform for an instrument or other object thereon while yet allowing the instrument or other object to be scanned.

It is another object of this invention to provide a single and positive locking system for the tripod legs to avoid damage to the device supported by the platform due to oversight in use of the multiple, manually operated clamping means normally employed.

SUMMARY OF THE INVENTION

These objects and others are achieved in one embodiment of the invention by the provision of a reservoir means attached to the tripod platform, said reservoir means including a hydraulic fluid and pneumatic fluid under pressure, by at least one piston and cylinder in each tripod leg and by valve means within said platform for controllably providing communication between said reservoir means and said leg cylinders.

BRIEF DESCRIPTION OF THE DRAWINGS

The invention can perhaps best be understood by reference to the following portion of the specification, taken in conjunction with the accompanying drawings in which:

FIG. 1 is a pictorial view showing one embodiment of the self-adjusting tripod;

FIG. 2 is a cut-away, side sectional view of the tripod showing details of the reservoir, valve, and the interior of one leg thereof;

FIG. 3 is a top sectional and plan view taken along the lines 3—3 in FIG. 2; and FIG. 4 is an exploded pictorial view showing one embodiment of the valve means in FIG. 2.

DESCRIPTION OF A PREFERRED EMBODIMENT

With particular reference now to FIG. 1, the self-adjusting tripod includes a platform 10 having a tri-legged support 12 secured to an upper surface thereof for receiving a threaded stud 16 while allowing access to a knurled knob 14 attached thereto. Arrangements of this type are common in the art for releasably securing a camera or other instrument to the tripod platform.

The tripod also includes three adjustable legs 18, 20 and 22, which are pivotably secured to corresponding extensions of the tripod platform 10. Each leg is of a telescopic type to be described in more detail hereinafter. A reservoir 24 is attached to the bottom of tripod platform 10 by threaded engagement with a corresponding extension thereof and includes means communicating with a valve within the tripod platform 10. The valve is controlled by the manipulation of a lever 26 extending from platform 10. Finally, communication is made from the valve to the interior of each of the legs 18, 20 and 22 by corresponding tubing connections 28, 30 and 32.

In FIG. 2, the tripod is shown in a partial side sectional view. The tripod platform 10 is seen to comprise an upper portion 10a on which the tri-legged support 12 rests, a lower portion 10b to which the reservoir 24 is attached, and a central valve portion 10c which is actuated in response to rotation of the lever 26.

The reservoir 24 is filled with a hydraulic fluid H, which is of an incompressible type, and a compressible pneumatic fluid P for exerting pressure on the hydraulic fluid H. For purposes of the present discussion, let it be assumed that the hydraulic fluid H has been driven by the pneumatic fluid P to an inlet of the valve within platform 10, and that the valve has been opened by appropriate manipulation of the lever 26 so as to provide a communicating path through the valve and the corresponding tubing connection 28 into the interior of leg 18.

As seen in FIG. 2, leg 18 is subdivided into three telescopic sections 18a, 18b and 18c. Sections 18a and 18b are hollow, and section 18c has a solid plug in its upper end. The fluid within section 18a first comes into contact with an enlarged-diameter portion 42 which defines a small aperture 44 for the passage of the hydraulic fluid into the interior of leg section 18b. A cup seal 46 provides a seal for the interior of leg sections 18a. A termination 40 of leg 18a provides a stop by engagement with portion 42. As can be noted, leg section 18b is reciprocal within leg section 18a by virtue of the force exerted by the hydraulic fluid.

Similarly, the fluid within leg section 18b bears against an enlarged portion 52 of leg section 18c. A cup seal 54 attached to portion 52 provides a seal for the interior of leg section 18b. A termination 50 of leg 18b provides a stop by engagement with portion 52. Leg section 18c terminates in a rubber tip 58.

Leg section 18c is thus reciprocal within leg section 18b in response to the force of the hydraulic fluid H.

Upper leg section 18a includes a pivot support 63 which is configured to fit between two corresponding projections 61 of the lower platform portion 10b. A pivot connection is made by means of a pivot pin 65 passing through projections 61 and pivot support 63. One end of the tubing connection 28 is terminated in a tubing nipple 64 which is threaded into a corresponding aperture 62 defined in a connector portion 60. The other end of tubing connection 28 is terminated in a similar nipple 67a which is threaded into a corresponding aperture 66a defined by the upper platform portion 10a.

The construction of legs 20 and 22 is identical to that of leg 18. As such, the tubing connections 30, 32 thereof are terminated in corresponding tubing nipples 67b, 67c which are threaded into corresponding apertures 66b, 66c defined in the upper platform portion 10a. In the embodiment shown the apertures 66a, 66b and 66c are spaced at 120° with respect to each other.

The construction of the valve in the tripod platform is seen in more detail in FIG. 4. Each of the apertures 66a, 66b and 66c communicates with corresponding passages 68a, 68b and 68c in upper platform portion 10b which in turn terminate in 120°-spaced apertures 70a, 70b and 70c in the lower face thereof. Also defined in this lower face are grooves 82a, 82b and 82c surrounding apertures 70a, 70b and 70c for reception of appropriate O-rings 86, and a single groove 84 for reception of an O-ring 88. In assembly, the O-rings 86, 88 bear against an upper surface of the valve portion 10c so as to minimize the leakage of hydraulic fluid H between the valve chambers including apertures 70a, etc., and from the chambers to the exterior of the tripod platform 10.

The valve portion 10c includes three passages 72a, 72b and 72c which are spaced at 120° from each other and which are aligned with the corresponding apertures 70a, 70b and 70c in upper portion 10a upon appropriate rotation of the valve portion 10c in response to manipulation of the lever 26.

The lower platform portion 10b also defines a central passage 76 therein which communicates with the interior of a tube 78 extending into the reservoir 24 in communication with the hydraulic fluid H. The passage 76 terminates in a recess 73 in a central portion 74 of an upper surface of platform portion 10b. Central portion 74 includes a groove 90 for the reception of an O-ring 92 and is defined by a circular surface 94 which terminates in radial shoulders 96, 98. In assembly, the valve portion 10c rests within the recess defined by surfaces 74, 94, 96 and 98. O-ring 92 provides a seal for a chamber also defined by the recess 73, the surface 74 and the valve portion 10c. The platform is maintained in assembly by suitable fastening means not illustrated.

The pneumatic fluid P and the hydraulic fluid H are introduced into the reservoir 24 by means of a stopcock 80 located in the lower surface thereof.

In operation, let it be assumed that the legs 18, 20 and 22 are first fully retracted. The pneumatic fluid P trapped within the reservoir 24 tends to push the hydraulic fluid H up through tube 78 to the inlet of the valve in the tripod platform 10, including aperture 76 and the chamber defined by the recess 73, the surface 74, the O-ring 92 and the valve portion 10c. If the lever 26 is in the extreme counterclockwise position abutting shoulder 98, the passages 72a, 72b and 72c are out of alignment with the corresponding passages 70a, 70b and 70c. Therefore, the hydraulic fluid passes from the lower chamber through apertures 72a, etc., into an upper chamber defined by the upper surface of valve portion 10c and the corresponding lower surface of portion 10a, but proceeds no further due to the seal provided by O-rings 86 and 88. In this position, the valve is closed.

However, when the lever 26 is rotated in a clockwise direction towards shoulder 96, the apertures 72a, 72b and 72c come into alignment with the corresponding apertures 70a, 70b and 70c. At this point, the valve is opened and a passage is effected for the hydraulic fluid H through the apertures 70a, etc., the corresponding passages 68a, etc., the tubing connections 28, 30 and 32, and into the interior of legs 18, 20 and 22.

The pressure of the hydraulic fluid H against the surfaces of portions 42 and 52 of leg sections 18b, 18c forces those sections to extend outwardly until they are fully extended or until the lever 26 is rotated to close the valve. Similar actions take place in the legs 20, 22. At this time the hydraulic fluid H is trapped within the legs to maintain the sections thereof in a given extension to support the load carried by tri-legged support 12.

If the pressure of the pneumatic fluid P is correctly chosen, the extending force exerted on the legs can be overcome by the exertion of a slight manual pressure on the tripod platform 10. In this manner, the user can direct the tripod platform 10. In this manner, the user can direct the tripod platform to any desired angle or position, then can lock the platform by rotation of the lever 26 so that the position or angle is maintained. To retract the legs, the valve is opened and manual pressure is exerted on the tripod platform 10 to force the hydraulic fluid H back into the reservoir 24.

The hydraulic fluid H should preferably be of a volatile type so that minor leakage thereof past the valve seals does not soil either the platform exterior or the hands or clothes of the user. In addition, the fluid H should have a relatively low viscosity to permit its easy flow into and out of the legs 18, 20 and 22. It also should be chemically inert with respect to the materials of the tripod, that is, with respect to the pneumatic fluid P, the metallic structure of the tripod, the seals, and any lubricants therefor, and should be non-toxic. Finally, the fluid H should be in its liquid phase, under the prevailing pressure conditions within the system, within a range of approximately −10° C. to 70° C. For example, the hydraulic fluid H might comprise an alcohol-based compound, alcohol, or a mixture thereof with water.

The pneumatic fluid P, on the other hand, should be chemically inert with respect to the materials with which it comes into contact, and especially with respect to the hydraulic fluid H. It must have low toxicity. The fluid P should also have a low solubility in the hydraulic fluid H and must not form an explosive mixture therewith at any condition of temperature and pressure occurring in the system.

When the hydraulic fluid H comprises water or an alcohol-water mixture, the pneumatic fluid may comprise air. A more preferable embodiment thereof would be a "low-boiler" such as those known by the trade name "Freon," at least for applications where the ambient temperature can be maintained within certain limits. If a low-boiler such as Freon is used so that the pneumatic fluid P exists in both the vapor and liquid phases, the pressure within the system, and hence the extending force, remains substantially constant and independent of the amount of extension. In addition, the volume of the reservoir 24 can be reduced by approximately two thirds.

The volume of the reservoir 24 is determined as follows. First, the volume should have a component equal to the difference between the combined volumes of the interiors of legs 18, 20 and 22, in their fully extended positions, and the combined volume thereof in their fully retracted positions. To this should be added a component sufficient to insure submergence of the tip of tube 78 in the hydraulic fluid H at any working position of the platform 10 with all legs fully extended. Additionally, a component must be provided to compensate for expected leakage of the hydraulic fluid H within a reasonable period of time. Finally, the "hydraulic" volume indicated above must be augmented by a "pneumatic" volume for the fluid P. With a single phase pneumatic fluid P, the "pneumatic" volume may be chosen to equal twice the "hydraulic" volume to allow to hold system pressure variations within acceptable limits between full extension and full retraction of the legs.

While the invention has been described with respect to a preferred embodiment thereof, it should be clear to those skilled in the art that the invention is not limited thereto. For example, the hydraulic fluid H could flow through corresponding passages in the lower tripod portion 10b and sealed pivots thereof into each leg, rather than through a separate tubing connection such as connections 28, 30 and 32. In addition, the design could be incorporated with other features of present tripod designs including manual leg clamping means, and forked upper leg sections.

The reservoir 24 could comprise an annular chamber with an aperture therethrough for the passage of a surveyor's plumb bob. Therefore, the limits of this invention are intended to be bounded only by those of the appended claims.

I claim:

1. A self-adjusting tripod comprising a platform, a reservoir attached to said platform, said reservoir containing a hydraulic fluid and a pneumatic fluid, under pressure, a plurality of legs pivotally secured to said platform, each of said legs including a plurality of telescopic sections, at least one of said sections including means defining a cylinder and further including an adjacent section including means defining a piston reciprocable in said cylinder, said platform including valve means having an inlet and a plurality of outlets, one outlet for each of said legs, means providing communication between said valve inlet and said reservoir, and means providing communication between each of said valve outlets and the cylinder within each of said legs, said valve means including a manually-operated control means for providing simultaneous communicating paths between said valve inlet and said plurality of valve outlets, said valve comprising means defining a chamber in said platform which is in communication with said valve inlet, means defining a plurality of apertures in said platform which are in communication with said plurality of valve outlets, and wherein said means for providing simultaneous communicating paths comprises a member situated between said plurality of apertures therethrough, said member being rotatable to a position where said second plurality of apertures are in alignment with said plurality of apertures in said platform.

2. A self-adjusting support structure comprising:
a platform,
a plurality of leg means connected to said platform, at least one of said leg means having a first portion thereof associated with a cylinder means and a second portion therefof associated with a piston means, said piston means translatable in said cylinder means for reciprocally extending and retracting said second portion of said leg means relative to said first portion of said leg means,
reservoir means connected to said platform defining a first reservoir portion containing a supply of hydraulic fluid, said reservoir means defining a second reservoir portion containing a pressurized pneumatic fluid, said second reservoir portion being in pressure communication with said first reservoir portion, and
valve means defining at least one inlet in fluid communication with said first reservoir portion and at least one outlet in fluid communication with said cylinder means, said valve means selectively operable to place said first reservoir portion in fluid communication with said cylinder means whereupon said pressurized pneumatic fluid can exert sufficient fluid pressure upon said hydraulic fluid in said cylinder means to create a force upon said piston means tending to translate said piston means relative to said cylinder means.

3. The structure as recited in claim 2 wherein each of said leg means have a cylinder means and a piston means, said valve means having an outlet in fluid communication with each of said cylinder means and wherein said valve means includes a manually-operated control means, and means responsive to said manually-operated control means for providing simultaneous communicating paths between said inlet and said outlets, and means for introducing a pressurized pneumatic fluid into said reservoir means.

4. The structure as recited in claim 2, wherein each of said leg means comprises a hollow, elongated tube defining said cylinder means, and a second, adjacent section therein comprises a cylindrical elongated member slidable in said tube which has an enlarged portion at one end thereof forming said piston means.

5. The structure as recited in claim 2, wherein said reservoir means contains a pneumatic fluid which comprises compressed air and a hydraulic fluid which comprises a mixture of alcohol and water.

* * * * *